March 4, 1930.  C. B. SCOTT  1,749,612
EYE TESTING APPARATUS
Filed June 13, 1927   3 Sheets-Sheet 1

INVENTOR
Charlie B. Scott,
By
ATTORNEY

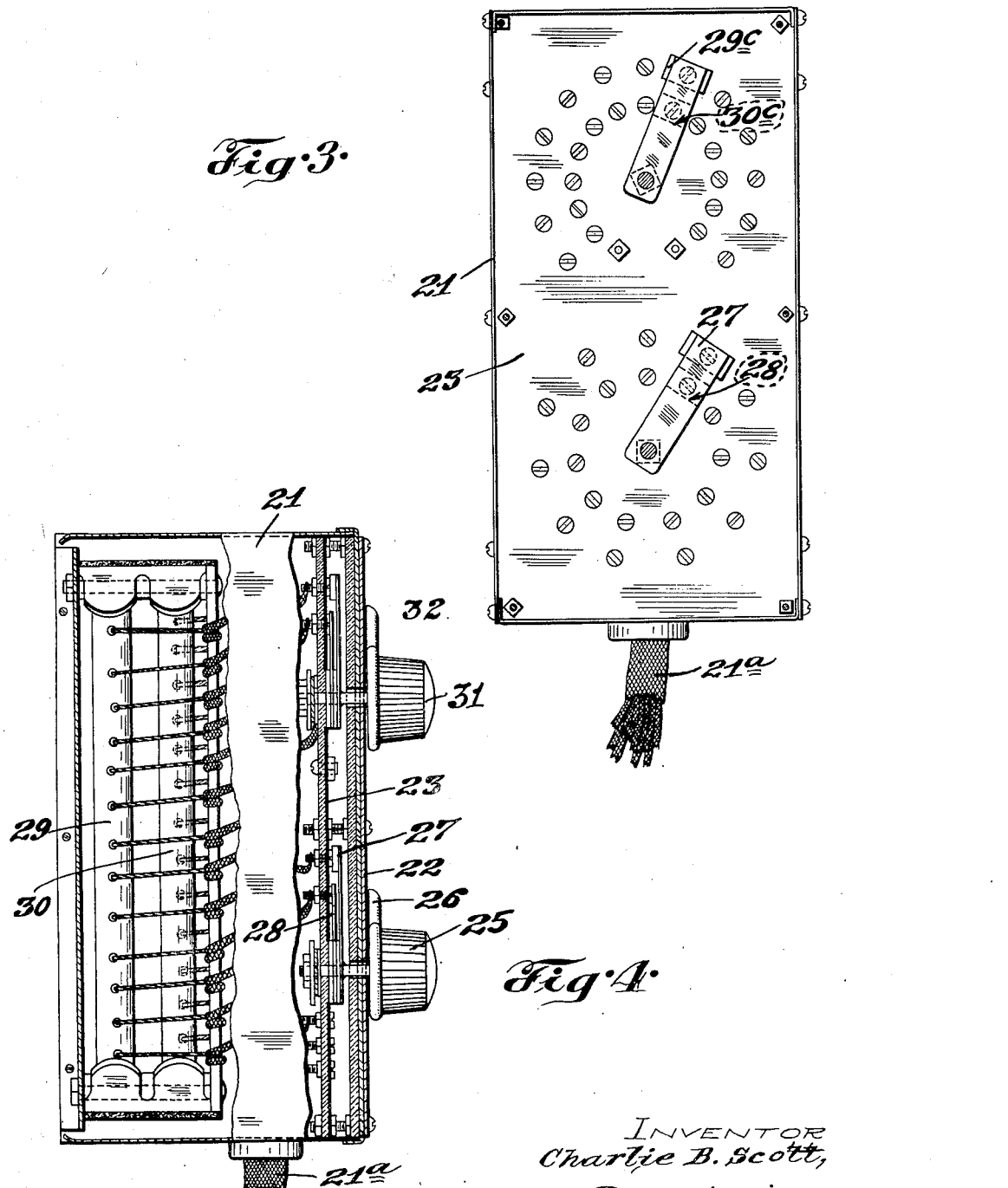

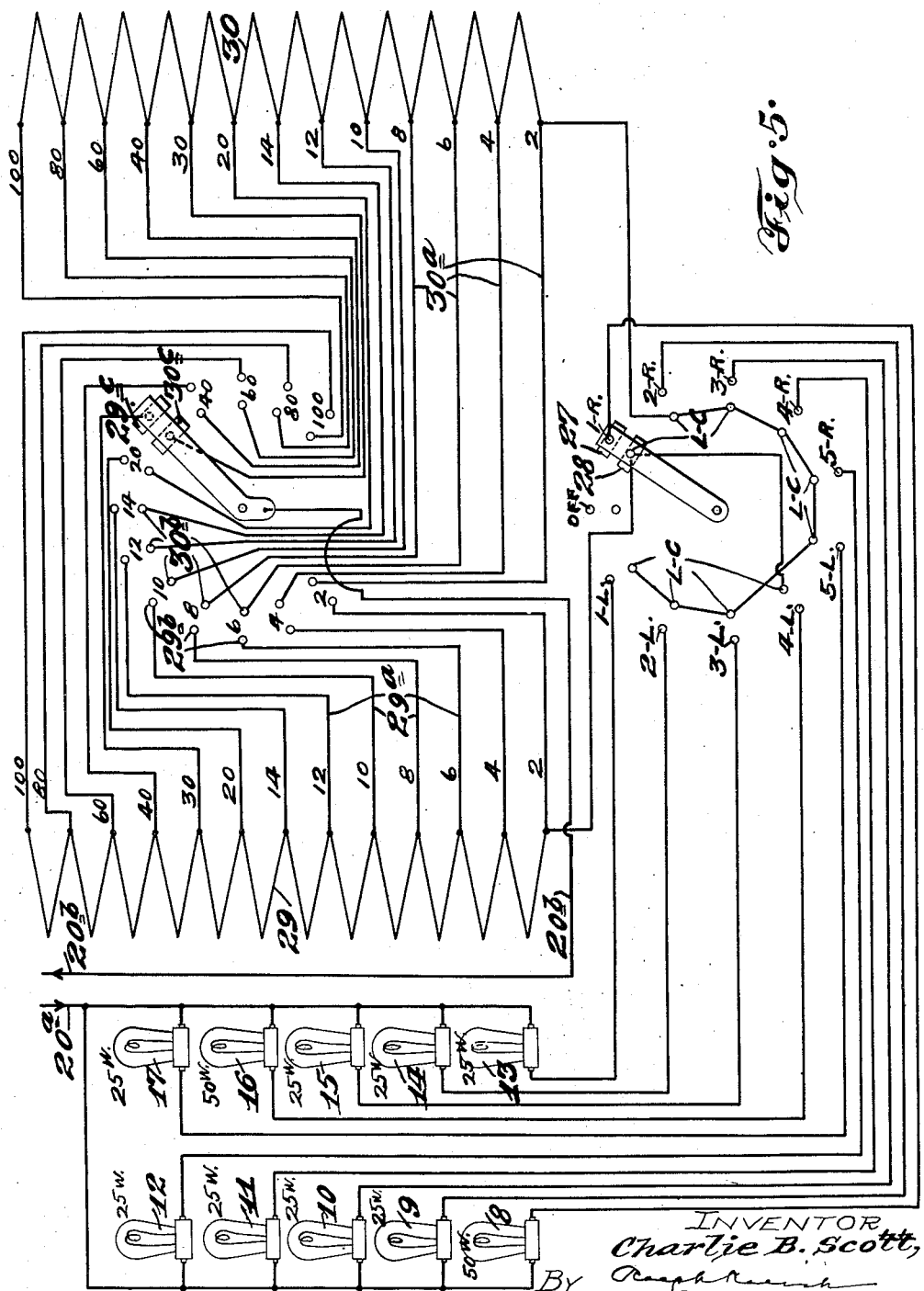

Patented Mar. 4, 1930

1,749,612

UNITED STATES PATENT OFFICE

CHARLIE B. SCOTT, OF ST. LOUIS, MISSOURI, ASSIGNOR TO M. E. GREEN MANUFACTURING CO., OF ST. LOUIS, MISSOURI, A CORPORATION OF MISSOURI

EYE-TESTING APPARATUS

Application filed June 13, 1927. Serial No. 198,562.

This invention relates generally to eye-testing apparatus of the class wherein the respective test devices, symbols, or other characters thereof are illuminated in use. More particularly, my present invention has to do with an apparatus of such type including a cabinet having a plurality of separate compartments that are normally closed by a common front plate or wall having sight openings correlated to the respective compartments, the sight openings being covered by illuminable, preferably translucent, panels which bear or upon which are located the different test objects, devices, symbols, or other such characters, and behind which, within the compartments, are disposed the illuminating lights that are under the control of an attendant for operation to bring into effective view the particular symptomatic test subject or character desired.

The present invention has for its principal object the provision of simple, convenient, and efficient means for selectively, at the will of the attendant, illuminating any of the respective compartments and controlling and varying the intensity and degree of diffusion of the light through the illuminable panels of the apparatus, so as to regulate the degree of clarity in the display of the test-character thereon, in order to more accurately determine the exact condition of the eye or eyes being tested.

And with the above and other objects in view, the invention resides in the novel general arrangement of the apparatus and in the peculiar means for selectively regulating and carrying, under the control and manipulation of the attendant, the lumens or units of light-flux from the several lighting elements of the apparatus.

In the accompanying drawings,

Figure 3 is a front elevational view of the controlling switch box with the front dial plate thereof removed, showing the arrangement of the terminal contact points of the respective light circuits and the lumens regulating circuits, together with the co-operating switch arms on the underlying supporting plate;

Figure 4 is a view of the controlling switch box, partly in side elevation and partly in longitudinal section, showing the arrangement of the lumens regulating elements and the switching elements for the same and the light circuits; and Figure 5 is a diagram of the lighting and lumens controlling circuits.

Figure 1:
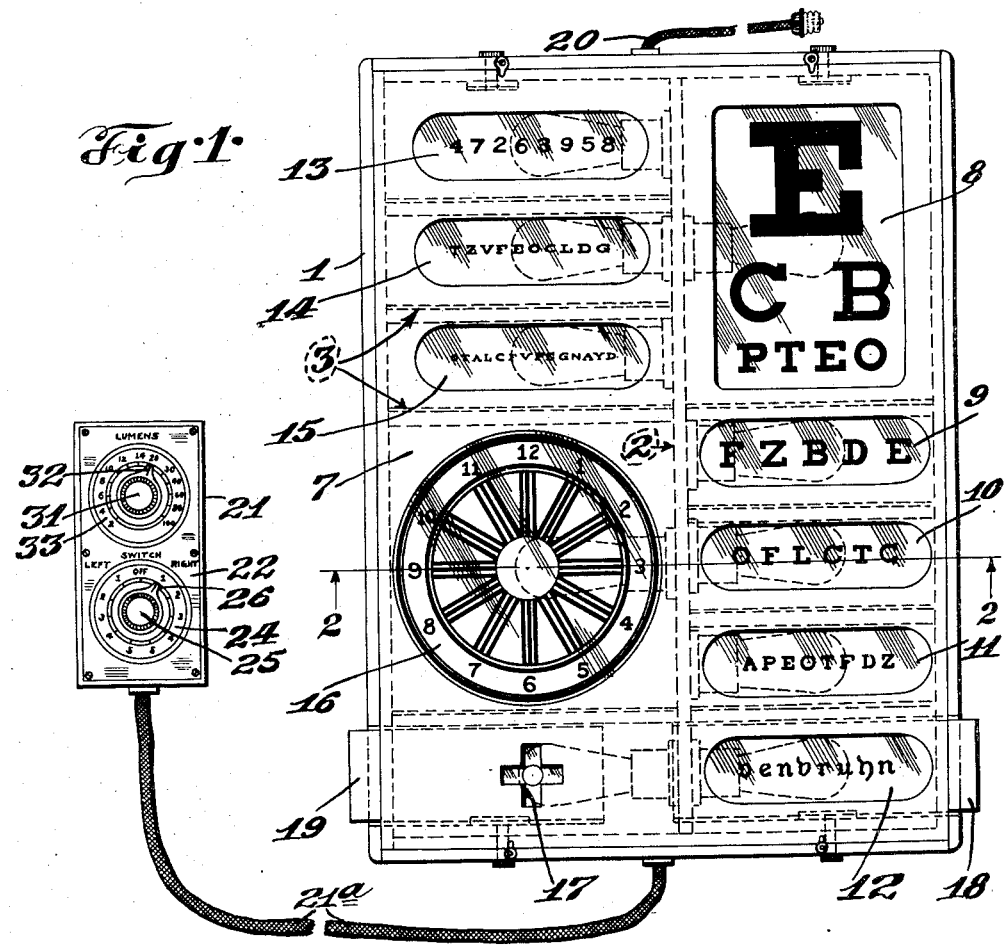
Figure 1 is a view of an apparatus embodying my invention, showing the test-cabinet and the controlling switch box in front elevation.
Figure 2:
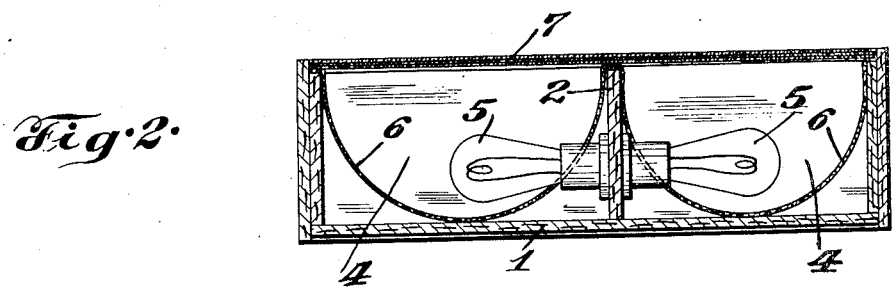
Figure 2 is a cross section of the test cabinet taken on or about the line 2—2, Figure 1.

Referring now more in detail and by reference characters to the drawings, which illustrate a practical and preferred embodiment of my invention, 1 designates a cabinet, which, as shown, is preferably of rectangular form and divided, by a central longitudinal partition 2 and transverse partitions 3, into two parallel tiers of separate compartments 4.

In each of the compartments 4, is an electric light bulb 5, the light from which is directed by reflectors 6 through sight openings in the front wall 7 of the cabinet, there being an opening for each of the compartments and the several openings being covered either by illuminable panels of a semi-transparent or translucent material bearing designs or characters, or by transparent material such as clear glass and unmarked, or left uncovered for the application thereto of removable and interchangeable panels or slides having thereon the respective test symbols or characters.

In the present embodiment of my invention, as shown in the drawings (see Figure 1), there are ten sight openings in the front wall 7 of the cabinet, there being five in each of the two tiers. The upper opening 8 of the tier to the right is rectangular and relatively large as compared to the openings 9, 10, 11, and 12 therebelow, which latter are oblong with the elongation thereof horizontally disposed. In the tier to the left, the three upper openings 13, 14, and 15 are oblong and similar to openings 9 to 12, inclusive, to the right, while immediately below is a circular opening 16, and below the latter another opening 17 substantially in the form of a Greek cross.

In the particular cabinet shown in the drawings, the several sight openings, except the lowermost openings 12 and 17, respectively, of the two tiers, are covered with the said translucent panels, the panel of the large rectangular opening 8 having the larger test letters or characters thereon and the panels of the oblong openings 9, 10, 11, 13, 14, and 15, respectively, having smaller sized characters thereon in graduated series, while on the panel in the circular opening 16 is an astigmatic dial. Preferably the lowermost opening 12 of the tier to the right is normally uncovered, or, if covered, has a clearly transparent panel, and with said opening interchangeable slides 18 of translucent material are adapted for co-operation, such slides having desirable test signs or characters thereon. Slides 19 of differently colored translucent material may be used in connection with the cross-shaped opening 17, or the slides 19 may be of opaque material and have apertures of various sizes therein to be brought into registration with the center of said opening 17 so as to serve as muscle test point-lights.

The particular arrangement of the sight openings and the character of the test objects or characters are, however, optional with the examining oculist or optician and may be varied according to his particular practice. Therefore, the arrangement thereof shown in the drawings is only illustrative of a practical adaptation of the present invention, which has more particularly to do with the control and regulation of the lighting elements in the respective chambers of the cabinet.

In practice, lights preferably of different wattage are used according to the area of the paneled sight openings. For example, the two relatively large panels 8 and 16 of the cabinet shown are lighted by, say, a 50 watt lamp, and all of the other panels by 25 watt lamps. Therefore, for illustration, the respective circuits and controlling devices are accordingly shown in the diagram in Figure 5.

The source of electrical supply for the lamps is tapped in the ordinary manner through a suitable plugged cord 20 (see Figure 1), the circuit wires 20ᵃ and 20ᵇ thereof being indicated in the diagram shown in Figure 5.

The wire 20ᵃ is connected by two branches respectively in multiple with the lamps of the two tiers of compartments of the cabinet, the respective lamps being, in turn, connected by separate wires to the terminal contacts on a switch-board or unit having controlling switches, whereby the circuits for the lamps may be closed selectively, at the will of the operator, according to the particular panel of the cabinet it is desired to illuminate, and whereby, also, the intensity of the illumination may be regulated and varied at will. This switch-board or unit, which is shown structurally in Figures 1, 3, and 4 of the drawings, is designated generally as 21. It comprises, as shown, a substantially rectangular casing having an outer dial plate 22 and an underlying terminal contact supporting plate 23.

The selective switch dial 24 (see Figure 1) has a neutral point at the middle of its upper portion which is indicated by the word "Off", and in an annular circular series on each side thereof are points designated by the numerals "1" to "5" inclusive, on the plate 22 and in association with the dial 24, are the words "Right" and "Left" to indicate directions in turning the knob 25 with its pointer 26 to the particular indication on the dial according to the panel of the cabinet 1 desired to be illuminated, that is to say, by turning the pointer 26 to the right, a lamp in one of the compartments of the right hand tier in the cabinet is lighted, and vice versa.

Rotatable with the knob 25, is a spring contact-member 27, which engages the respective terminal contacts on the plate 23 at the ends of the circuit wires leading from the lamps, said terminal contacts being marked in the diagram in Figure 5 of the drawings by the reference characters "1—R" to "5—R", inclusive, and "1—L" to "5—L", inclusive, the "R" meaning "right" and the "L" meaning "left", or, in other words, corresponding to the right and left tiers, respectively, of the compartments of the cabinet 1.

Correlated to each of said terminal contacts on the plate 23, is a companion terminal contact of what may be termed the "lumens circuit" and said lumens contacts are accordingly marked "L—C", meaning "lumens contact". Companion to said switch contact-element 27 and electrically connected thereto, is a similar contact element 28, which engages one of said lumens contacts simultaneously as said contact element 27 engages its companion lamp wire terminal contact.

The lumens regulating means includes a suitable resistance, there being a separate resistance coil or device for a lamp or lamps of a certain wattage. In this case, as illustrated, there being provision for two wattages, namely, 50 watt and 25 watt lamps, respectively, two separate coils are indicated in the drawings, the one, 29, being for the 50 watt lamps and the other, 30, being for the 25 watt lamps. It is to be understood, however, that this is merely for the purpose of simplicity and facility in illustrating the invention, which is not to be thereby limited.

By referring to the diagram in Figure 5 of the drawings, it will be noted that only two of the "L—C" terminal contacts, that is, those correlated to the cabinet panels 8 and 16, shown in Figure 1 and whose lamps are correspondingly marked "8" and "16" in the diagram, are in circuit with the resistance coil 29, while all of the other "L—C" terminals are in circuit with the resistance coil 30.

The different stages of the coils 29 and 30 are connected by branch wires 29ª and 30ⁿ, respectively, to separate terminal contacts 29ᵇ and 30ᵇ on the plate 23 of the switchboard or unit 21, said terminal contacts being arranged in an annular series and the terminal of a particular stage of the one coil being in companion relation to that of the other coil. Co-operating with the terminal contacts 29ᵇ and 30ᵇ, are rotatable switch contact elements 29ᶜ and 30ᶜ, respectively, which are both connected electrically to the wire 20ᵇ of the electrical supply cord 20.

The two switch elements 29ᶜ and 30ᶜ are simultaneously operated by a knob 31 having a pointer 32 which co-operates with a dial 33 on the dial plate 22 of the switch-board or unit 21. This dial 33 is marked with the notations of the different stages of the resistance coils 29 and 30, there being thirteen stages indicated in the drawings and the gradation being designated by numerals in multiples of two, from 2 to 14, inclusive, and then by tens, from 20 to 40, inclusive, and thence by twenties, from 60 to 100, inclusive. These notations are also indicated in the diagram shown in Figure 5 of the drawings.

When the selective switch pointer 26 is on the neutral or "off" point on the dial 24, the lighting circuit is broken and no electrical current whatever is passing through any of the circuits. As soon, however, as the pointer 26 is moved to the right or to the left, as the case may be, and electrically engaged with any particular lamp-circuit terminal, the circuit for the particular lamp in the so selected compartment of the cabinet 1 is closed, and then, by manipulation of the lumens-pointer 32, the intensity of the degree of light given out or diffused by the particular lamp is selectively controlled and varied by the lumens regulating means to the degree indicated by the position of the pointer 32 on the dial 33.

Obviously, the cabinet 1 may be placed in the proper location for convenient vision by the person whose eyes are being examined, and the switch-board or controlling unit 21 located conveniently on the wall, a table or other support within easy reach of the examiner or attendant, so that he may have a view of the panels of the cabinet and at the same time be in a position to observe, direct, and question the patient during the examination.

As illustrated in the diagram in Figure 5, the lumens switch is set to position for stage "30" of the resistance coils, and the selective switch is set to position for compartment 8, which, as shown in Figure 1, is the large one in the upper right hand corner of the cabinet and contains the higher powered lamp. This lamp is marked "8", in the diagram, wherein the arrangement is shown in reversed and inverted relation to that shown in Figure 1 in order to simplify the layout. As the examination proceeds the examiner may manipulate the lumens switch to control the diffusion of light in this compartment, and he may also switch from one panel to another and likewise vary the intensity of the illumination thereof, at will, so as to more readily detect visual error and arrive at a more accurate diagnosis of the condition of the patient's eyes.

I may add that, as best seen in Figure 1, the several conductors, shown in Figure 5, connecting one side of the several lamps of the cabinet with the respective switch-dial contacts 1—L to 5—L and 1—R to 5—R, both inclusive in each series, suitably lead, preferably enclosed in a sheathing 21ª, from the cabinet to the switch-casing 21.

Thus, in a convenient and efficient manner, the several panels of the cabinet may be selectively illuminated for test purposes, and hand in hand therewith, the intensity of the illuminating light transmitted or diffused through the selected panel may be selectively varied, within the limits of the particular apparatus, to meet substantially all test-purposes.

My new apparatus structurally admits of considerable modification, and hence it is to be understood that changes in the form, construction, arrangement, and combination of the several parts of my apparatus may be made and substituted for those herein shown and described without departing from the nature and principle of my invention.

Having thus described my invention, what I claim and desire to secure by Letters Patent is:

1. In combination with a source of current supply, leads to and from the source of supply, a series of translating devices electrically connected with one of the leads in multiple with each other, a series of independent terminal-contacts for the translating devices, a resistance permanently in series with the other lead, a series of contacts for the resistance, there being one resistance contact in permanent pair-relation with each of the respective terminal-contacts, and a shiftable switch-member adapted for electrically connecting the respective pairs of terminal and resistance contacts for selectively energizing the translating devices.

2. In combination with a source of current supply, leads to and from the source of supply, a series of translating devices electrically connected with one of the leads in multiple with each other, a series of independent terminal-contacts for the translating devices, a stepped resistance permanently in series with the other lead, a series of contacts for the stepped resistance, there being one resistance contact in permanent pair-relation with each of the respective terminal-contacts, a shiftable switch-member adapted for electrically connecting the respective pairs of terminal and resistance contacts for selectively energizing the translating devices, and a second shiftable switch-member for regulating the amount of resistance for varying the intensity of the current through the selected translating device.

3. In combination with a source of current supply, a lead from the source of supply, a series of illuminating lamps electrically connected with said lead in multiple with each other, a series of terminal-contacts for the lamps, there being one contact for each respective lamp, a return lead to said source of supply, a stepped resistance permanently in series with the return lead, a series of contacts for the resistance, there being one resistance-contact in permanent pair-relation with each of the respective contact-terminals, a shiftable switch-member adapted for electrically connecting the respective pairs of resistance and terminal contacts for selectively energizing the lamps, and a second shiftable switch-member associated with the resistance for regulating the resistance for varying the intensity of illumination of the selected lamp.

In testimony whereof, I have signed my name to this specification.

CHARLIE B. SCOTT.